United States Patent
Haque et al.

(10) Patent No.: US 8,964,794 B2
(45) Date of Patent: Feb. 24, 2015

(54) LOW LATENCY AND SELF-ADJUSTING FRAME SYNCHRONIZATION ALGORITHM FOR DATA STREAMING APPLICATIONS

(71) Applicant: Honeywell International Inc., Morristown, NJ (US)

(72) Inventors: Jamal Haque, Clearwater, FL (US); Darryl I. Parmet, Tampa, FL (US); Halil N. Altan, Heathrow, FL (US); Kurt Holmquist, Lutz, FL (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 14/166,140

(22) Filed: Jan. 28, 2014

(65) Prior Publication Data

US 2014/0269780 A1    Sep. 18, 2014

Related U.S. Application Data

(62) Division of application No. 13/089,919, filed on Apr. 19, 2011, now Pat. No. 8,675,690.

(51) Int. Cl.
*H04L 7/08* (2006.01)
*H04L 7/10* (2006.01)
*H04J 3/06* (2006.01)

(52) U.S. Cl.
CPC ............. *H04L 7/08* (2013.01); *H04J 3/0608* (2013.01); *H04L 7/10* (2013.01)
USPC .......................................... 370/509; 375/356

(58) Field of Classification Search
CPC ............ H04L 7/08; H04L 7/10; H04J 3/06; H04J 3/0602; H04J 3/0605; H04J 3/0608
USPC ........... 370/350, 503, 509–516; 375/354, 356
See application file for complete search history.

(56) References Cited

U.S. PATENT DOCUMENTS

| | | | |
|---|---|---|---|
| 4,228,461 A | 10/1980 | Weissmueller |
| 4,858,232 A | 8/1989 | Diaz et al. |
| 5,509,038 A | 4/1996 | Wicki |
| 5,570,368 A | 10/1996 | Murakami et al. |
| 5,615,237 A | 3/1997 | Chang et al. |
| 5,892,802 A | 4/1999 | Jung et al. |

(Continued)

OTHER PUBLICATIONS

U.S. Patent and Trademark Office, "Notice of Allowance", "from U.S. Appl. No. 13/089,919", Oct. 30, 2013, pp. 1-14, Published in: US.

(Continued)

*Primary Examiner* — Paul H Masur

(74) *Attorney, Agent, or Firm* — Fogg & Powers LLC

(57) ABSTRACT

A method for maintaining a nominal decoder time phase alignment through a data drop-out period is provided. The method includes determining if a search window is open. A search-window width of the search window is an initial search-window width. The initial search-window width is larger than the width of the frame synchronization pattern. The method also includes determining if a bit clock rising edge is detected and searching for the frame synchronization pattern on a bit level when the search window is open and the bit clock rising edge is detected. If the frame synchronization pattern is not found responsive to the searching, the method also includes determining if a receipt time of the bit received when the bit clock rising edge was detected is coincident with an expected start time of the frame synchronization pattern.

10 Claims, 10 Drawing Sheets

(56) References Cited

U.S. PATENT DOCUMENTS

| | | |
|---|---|---|
| 6,594,327 B1 | 7/2003 | Radi |
| 6,826,245 B1 * | 11/2004 | Brown et al. ............ 375/368 |
| 6,928,038 B2 | 8/2005 | Tsai et al. |
| 6,963,627 B1 | 11/2005 | Radi |
| 6,982,971 B2 | 1/2006 | Tiedemann, Jr. et al. |
| 7,173,668 B2 | 2/2007 | Renner et al. |
| RE40,918 E | 9/2009 | Dupuy |
| 7,983,308 B1 * | 7/2011 | Johnston et al. ........ 370/514 |
| 7,991,296 B1 * | 8/2011 | Johnston et al. ........ 398/154 |
| 2005/0265454 A1 | 12/2005 | Muthukrishnan et al. |
| 2009/0262875 A1 * | 10/2009 | Arai ........................ 375/373 |
| 2010/0150054 A1 | 6/2010 | Becker et al. |
| 2011/0013650 A1 * | 1/2011 | McElvain ................ 370/503 |

OTHER PUBLICATIONS

U.S. Patent and Trademark Office, "Office Action", "from U.S. Appl. No. 13/089,919", Apr. 11, 2013, pp. 1-21, Published in: US.

U.S. Patent and Trademark Office, "Restriction Requirement", "from U.S. Appl. No. 13/089,919", Mar. 13, 2013, pp. 1-7, Published in: US.

* cited by examiner

LOW LATENCY AND SELF-ADJUSTING FRAME SYNCHRONIZATION ALGORITHM FOR DATA STREAMING APPLICATIONS

CROSS-REFERENCE TO RELATED APPLICATIONS

This application is a divisional of U.S. application Ser. No. 13/089,919 filed on Apr. 19, 2011, entitled "A NOVEL LOW LATENCY AND SELF-ADJUSTING FRAME SYNCHRONIZATION ALGORITHM FOR DATA STREAMING APPLICATIONS", now U.S. Pat. No. 8,675,690, the disclosure of which is hereby incorporated herein.

GOVERNMENT INTEREST STATEMENT

This invention was made with Government support under USAF ARFL/SV-SSLT. The Government has certain rights in the invention.

BACKGROUND

Data transmitted in any serial fashion requires some method to determine where the data (payload) is positioned within the received data stream. The detection of the beginning of the payload is critical.

SUMMARY

The present application relates to a method for maintaining a nominal decoder time phase alignment through a data drop-out period. The method includes determining if a search window is open. A search-window width of the search window is an initial search-window width. The initial search-window width is larger than the width of the frame synchronization pattern. The method also includes determining if a bit clock rising edge is detected and searching for the frame synchronization pattern on a bit level when the search window is open and the bit clock rising edge is detected. If the frame synchronization pattern is not found responsive to the searching, the method also includes determining if a receipt time of the bit received when the bit clock rising edge was detected is coincident with an expected start time of the frame synchronization pattern.

The details of various embodiments of the claimed invention are set forth in the accompanying drawings and the description below. Other features and advantages will become apparent from the description, the drawings, and the claims.

DRAWINGS

Like reference numbers and designations in the various drawings indicate like elements.

DETAILED DESCRIPTION

Figure 1:
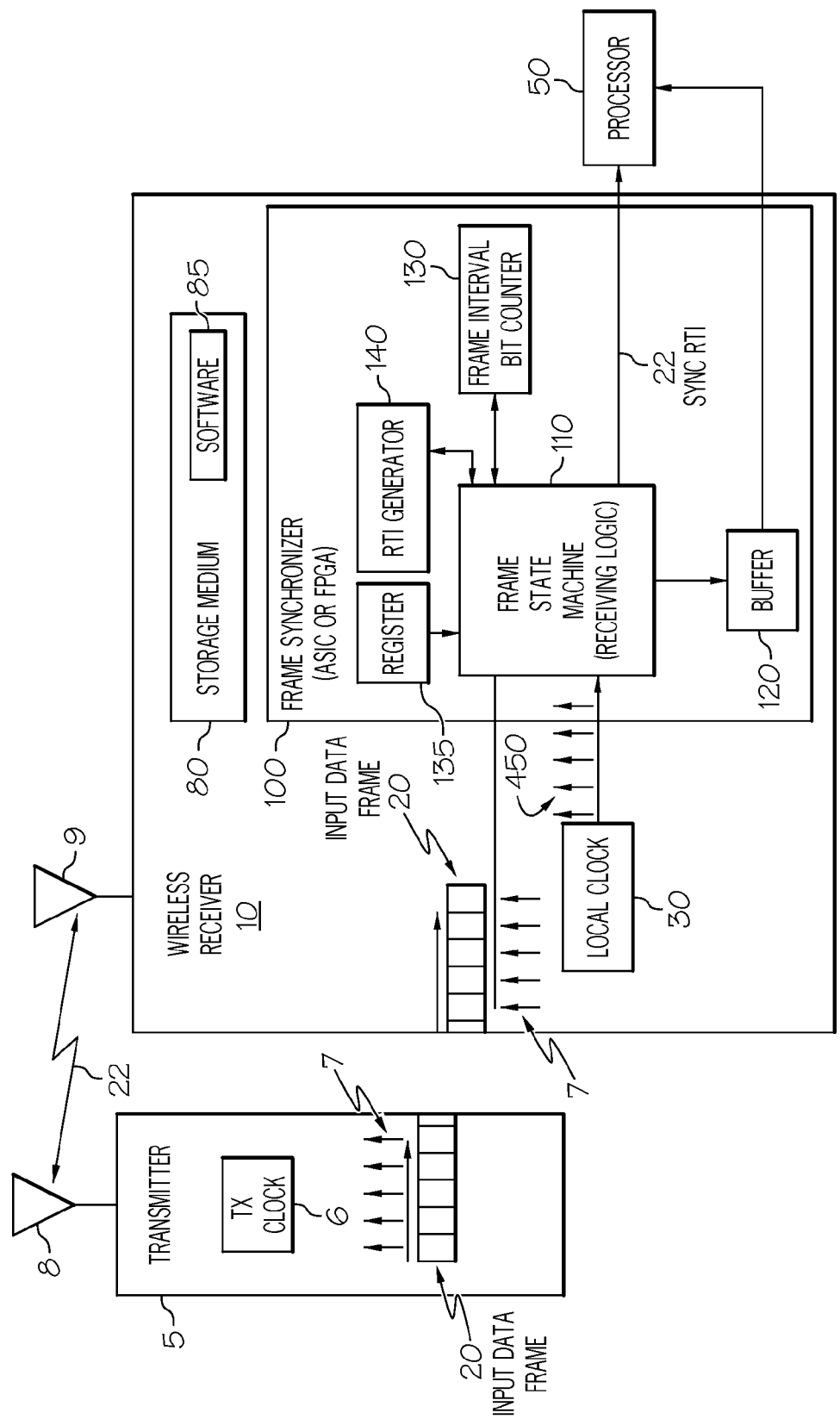
FIG. 1 is a block diagram of an exemplary frame state machine in a wireless receiver in accordance with the present invention.

Wireless data transmissions are prone to bit slips or bit error. Any slip, extended bit errors, or drift of the transmitter oscillator or receiver oscillator cause misinterpretation of the bit start location.

Frame synchronization is used for wirelessly connected navigation systems. The start-up time, re-synchronization time, data reliability and latencies are critical to the accuracy of a navigation solution. For example, aircrafts include navigation systems which obtain sensor data from gyroscopes and/or accelerometers in an inertial measurement unit (IMU) in order to determine the exact location of the aircraft as it moves. If sensor data in the data stream from the IMU is lost because of a loss in synchronization, the safety of the aircraft can be jeopardized. In case of synchronization loss, the recovery time will result in loss of sensed data with a resultant loss of navigation accuracy. Glitches or power cycles can cause data loss in time sensitive data including sensor, audio, and video data being transmitted and received. Therefore, glitches or power cycles for synchronization should be minimized during flight for an accurate navigation solution. A receiver receiving the data stream must recover quickly (and preferably without data loss of more than a few bits) from a slip in synchronization between two ends of the data stream transmission/reception. Typically, a recovery on the order of a few microseconds is desired to ensure the safety of the aircraft and the receipt of critical data. The described embodiments are not limited to avionic applications, and are also applicable to any data streaming application.

A frame synchronizer detects the frame synchronization pattern, which is a known binary pattern that is periodically repeated within the data stream. The periodicity of the frame synchronization pattern is proportional to the frame synchronization time. To reduce false frame synchronization lock, multiple frame synchronization patterns are detected before the algorithm claims a frame lock. Currently, if the frame synchronization is lost, a prior art frame state machine cycles back to search mode and searches for the frame synchronization pattern again. The prior art re-synchronization time is as long as the synchronization time during power up since, once the frame synchronization pattern is relocated in the data stream, the frame state machine checks for multiple cycles before the algorithm reclaims a frame lock. Thus, the prior art receiver takes more than a few microseconds to recover from a slip in the time synchronization between two ends of the data stream transmission/reception.

In some embodiments, the frame synchronizer recognizes the frame synchronization pattern and aligns the data into minor frames or sub-frames. In such an embodiment, the frame synchronization pattern is typically followed by a counter, which dictates which minor frame or sub-frame in the series is being transmitted. The correlation between the frame synchronization pattern and the counter is especially important in a decommutation stage, when all the data is deciphered according to the sampled attribute. Different commutations require a constant awareness of which section of the major frame is being decoded and used to frame align a serial binary stream. Thus, an extended re-synchronization time is detrimental to synchronization to sub-frames.

A frame synchronization window (also referred to herein as a search window) is the approximate time when the receiver is expecting to receive a frame synchronization pattern in a data stream. The frame synchronization window described herein include a buffer time before and after the exact time in which the receiver is expecting to receive a frame synchronization pattern in a data stream.

For the receivers described herein, once a frame synchronization pattern is recognized and locked, subsequent frame synchronization or correction has extremely low synchronization time (less than a few milliseconds) and occurs much more quickly than in the known prior art techniques. The described embodiments minimize the time required for a receiver to realign a decoding algorithm to a data stream in the presence of data dropouts, by maintaining a nominal decoder time phase alignment through the data drop-out period. The described embodiments also minimize data loss by capturing (buffering) data from the expected arrive time of the frame synchronization pattern.

The method described herein synchronizes data frames by forcing a frame state machine to an operate mode following an initial synchronization and maintaining the frame state machine in operate mode even when synchronization is lost. The initial synchronization includes a search mode, in which the state machine searches for the frame synchronization pattern. If synchronization is lost, the receiver system re-establishes synchronization at a bit level while continuing to run the frame state machine in the operate mode. The frame state machine does not need to return to the time consuming search and check/lock modes in order to re-establish a lock on the frame synchronization pattern.

The system described herein predicts when the frame synchronization pattern is expected to arrive and starts to record data in the frame from that point in time (also referred to herein as "predicted time"). If the frame synchronization pattern arrives early (prior to the predicted time), the data immediately following the frame synchronization pattern is recorded in a buffer. If the frame synchronization pattern arrives late (after to the predicted time), when the predicted time arrives, the data is stored in the buffer. If the frame synchronization pattern is detected later on in the frame, the data that was recorded starting at the predicted time is overwritten by the data following the frame synchronization pattern, since the data following the frame synchronization pattern is correct data.

Thus, the method of synchronization described herein prevents loss of data due to false lock or loss of synchronization by capturing the payload data as the state machine, while operating in the operate mode, re-establishes synchronization. In addition, the method of synchronization described herein is independent of the data packet size. In prior art techniques, longer data packets require longer the re-synchronization.

FIG. 1 is a block diagram of an exemplary frame state machine 110 in a wireless receiver 10 in accordance with the present invention. The wireless receiver 10 is communicatively coupled to a wireless transmitter 5 via transmitter antenna 8, wireless communication link 22 and receiver antenna 9. The receiver antenna 9 is an interface to receive input (the input data frames 20 in a data stream) from the wireless transmitter 5. The wireless receiver 10 includes the frame synchronizer 100, a local clock 30, and storage medium 80. Software 85, including a low latency, self adjusting frame synchronization algorithm, is stored in the storage medium 80. The software 85 includes software, firmware or other program code. The wireless receiver 10 is also referred to herein as a "circuit 10" that synchronizes frames when a frame synchronization pattern is lost.

In one implementation of this embodiment, the frame synchronizer 100 is an application-specific integrated circuit (ASIC) or a field-programmable gate array (FPGA). Output from the wireless receiver 10 is sent from the frame synchronizer 100 to a processor 50. In one implementation of this embodiment, the processor 50 is part of the wireless receiver 10.

The local clock 30 is also referred to herein as "bit sync clock" or "incoming data clock 30". The frame state machine 110 runs faster than the clock rate of the local clock 30. In one implementation of this embodiment, the frame state machine 110 runs four times faster than the clock rate of the local clock 30.

The wireless transmitter 5 includes a transmitter (TX) clock 6 that generates clock signals 7, which are synchronized with the start of each bit in the input data frame 20. The bit clock rising edge of the clock signal 7 is indicated by the arrows. The clock signals 7 and the data stream including a plurality of input data frames 20 are transmitted to the wireless receiver 10 via wireless communication link 22. Thus, the bit clock signals 450 (the arrows indicate the rising edges of the clock bits) generated at the bit sync clock 30 (oscillator 30) delineate bits received at the wireless receiver 10.

The frame synchronizer 100 includes the frame state machine 110, a buffer 120, a register 135, a real-time-interrupt (RTI) generator 140, and a frame interval bit counter 130. The frame interval bit counter 130 counts the bits in a received data frame 20. The counting by the frame interval bit counter 130 is used to predict when the next frame synchronization pattern is expected. The register 135 buffers (stores) a number of bits equal to the number of bits in the frame synchronization pattern. For example, if the frame synchronization pattern includes N bits, where N is an integer, the register 135 stores N bits. As a new bit from the data stream is received, the register stores that bit and drops the oldest (longest stored) bit. RTI generator 140 is synchronized to the frame synchronization pattern. When the frame synchronization pattern is lost and regained, the frame state machine 110 signals the RTI generator 140 with a pulse in order to resynchronize the RTI generator 140 to the newly acquired frame synchronization pattern.

The incoming-data clock 30 is communicatively coupled to output bit clock signals 450 to the frame synchronizer 100 in synchronization with each bit in the input data frame 20 received from the wireless transmitter 5. In one implementation of this embodiment, the transmitter 5 is part of a sensor system including sensors. In this case, the wireless transmitter 5 transmits sensor data. The frame state machine 110 and the register 135 receive the bit clock signals 450 from the incoming-data clock 30 and receive the bits in the input data frame 20 from the wireless transmitter 5.

The frame state machine 110 is connected to output signals to the frame interval bit counter 130 and to receive data from the frame interval bit counter 130. The frame interval bit counter 130 sends a signal to the frame state machine 110 when the frame synchronization pattern is expected to be received at the frame state machine 110. In one implementation of this embodiment, the frame state machine 110 outputs a reset signal to the frame interval bit counter 130 when the frame synchronization pattern is received at a time other than the expected time.

The frame state machine 110 is communicatively coupled to output at least one input data frame 20 (including payload bits from the input data frame 20) to the buffer 120. The frame state machine 110 is connected to output a synchronization signal (synch RTI) 22 to the processor 50. The buffer 120 is connected to output data to the processor 50 and to receive signals from the processor 50.

Buffer 120 includes any suitable memory now known or later developed such as, for example, random access memory (RAM), read only memory (ROM), and/or registers within the processor 50. In one implementation, the processor 50 includes a microprocessor or microcontroller. Moreover, although the processor 50 and buffer 120 are shown as separate elements in FIG. 1, in one implementation, the processor 50 and buffer 120 are implemented in a single device (for example, a single integrated-circuit device). The software 120 and/or firmware executed by the processor 50 includes a plurality of program instructions that are stored or otherwise embodied on a storage medium 130 from which at least a portion of such program instructions are read for execution by the processor 50. In one implementation, the processor 50 includes processor support chips and/or system support chips such as application-specific integrated circuits (ASICs).

Figure 2:
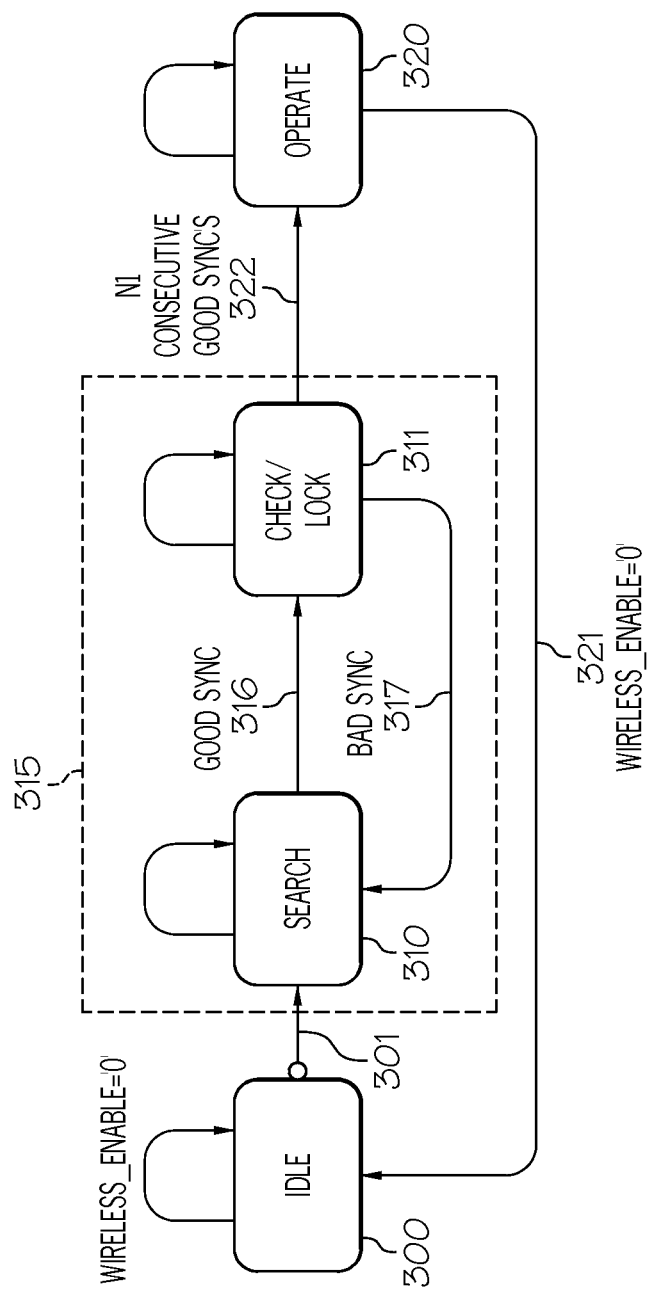
FIG. 2 is a block diagram showing modes of the frame state machine of FIG. 1 in accordance with the present invention.
Figure 3:
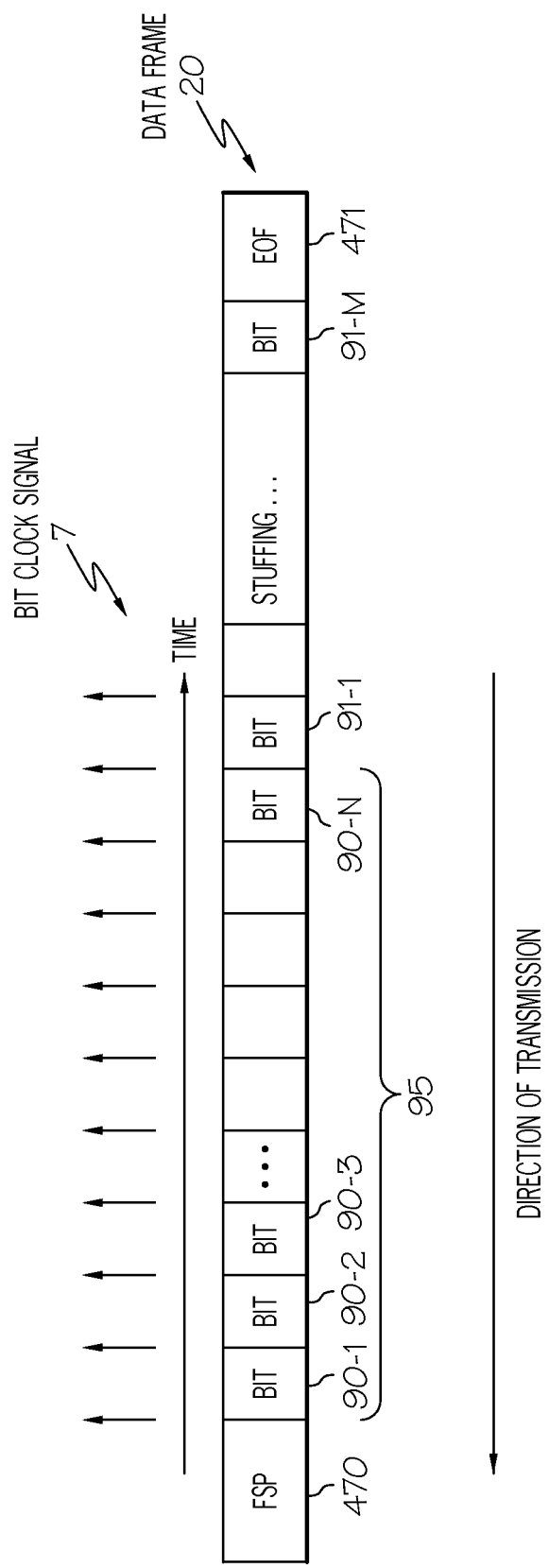
FIG. 3 is a block diagram showing a data frame and associated bit clock signals in accordance with the present invention.

FIG. 2 is a block diagram showing modes of the frame state machine 110 of FIG. 1 in accordance with the present invention. FIG. 3 is a block diagram showing a data frame 20 and associated bit clock signals 7 (FIG. 1) in accordance with the present invention. The data frame 20 and associated bit clock signals 7 are generated by the wireless transmitter 5. The data frame 20 is sent via wireless communication link 22 to the receiver 10. The bit clock signals 7 are not sent to the receiver 10 but they are synchronized with the bit clock signals 450 generated by the incoming-data clock 30 as described above. The data frame 20 includes a frame synchronization pattern (FSP) 470, a plurality of bits 90(1-N), and end of frame (EOF) bits 471. The plurality of bits 90(1-N) are the payload 95 of the data frame 20. If the payload 95 of the data frame 20 does not fill the space available between the last bit of the frame synchronization pattern 470 and the end of frame (EOF) bits 471, the data frame 20 is stuffed with bits 91(1-M) to fill in the data frame 20. The data frame 20 is also referred to herein as data packet 20. The frame synchronization pattern 470 is a known binary pattern of bits used to mark the start of bits 90(N-1) in the input data frame 20.

The idle mode 300 (idle state 300) occurs when the frame state machine 110 is not receiving a data stream (including the data frame 20) from the wireless transmitter 5. As shown in FIG. 2, a transition from operate mode 320 to idle mode 300 is triggered (initiated) when a Wireless_Enable signal is set to zero (0) as shown by the arrow 321. The idle mode 300 is maintained as long as the Wireless_Enable signal remains set to zero (0). When the Wireless_Enable signal is no longer zero (0), the frame state machine 110 transitions to the search mode 310 (search state 310) as shown by the arrow 301.

During search mode 310, the frame synchronizer 100 looks for a frame synchronization pattern 470 that denotes the start of the payload 95 in a data packet 20. When the frame synchronization pattern 470 is found, the frame state machine 110 advances to check mode 311 as shown by the arrow 316 labeled "Good SYNC". The check mode 311 of FIG. 2 includes both the check process and the lock process and is also referred to herein as check/lock mode 311 or check/lock state 311. The search mode 310 and the check/lock mode 311 together form an initial synchronization mode represented generally at 315.

During the check mode 311, the frame synchronizer 100 counts rising edges of the bit clock signals 450 output from the incoming-data clock 30 in order to count the bits 90 associated with the bit clock signals 450 and checks if the next expected frame synchronization pattern 470 occurs when expected.

If the frame synchronization pattern 470 is not found when expected during the check mode 311, the frame state machine 110 transitions back to the search mode 310, as shown by the arrow 317 labeled "Bad SYNC". Every time the frame synchronization pattern 470 is found as expected, the check mode 311 continues to check for the next frame synchronization pattern 470 until a selected number (e.g., N1) of consecutive valid frame synchronization patterns 470 are received.

When the selected number of consecutive valid frame synchronization patterns 470 is received, the frame state machine 110 is locked to the frame synchronization pattern 470. During lock mode, the frame state machine 100 triggers the run time interrupt (RTI) generator with a pulse to synchronize it to the frame synchronization and advances to operate mode 320 (operate state 320). Once in the lock mode 311, the wireless receiver 10 expects the frame synchronization pattern 470 to periodically appear in the same (usually first) time slot of the input data frame 20. This requires the transmitter clock 6 (oscillator 6) in the wireless transmitter 5 to be stable.

When lock is established, the frame state machine 110 transitions to operate mode 320 as shown by arrow 322 labeled "N1 consecutively good SYNCS". In the operate mode 320, the wireless receiver 10 continues to count out the number of payload bits 90(1-N) and stuffed bits 91(1-M) in the input data frame 20 verify the frame synchronization pattern 470 has arrived, and enable a write controller for the data buffer 120 (FIG. 1) so the data buffer 120 period s the payload 95 of the received input data frame 20.

The frame state machine 110 remains in operate mode 320 until the Wireless_Enable signal is set to zero (0). Even if synchronization is lost, as long as the Wireless_Enable signal is not set to zero (0), the frame state machine 100 remains in operate mode 320 and does not return to search mode 310. Thus, unlike prior art frame state machines, the frame state machine 110 runs in the operate mode 320 without return to the search mode 310 when synchronization is lost. The frame state machine 110 only transitions to idle mode 300 from operate mode 320 and does not transition from operate mode 320 to search mode 310.

The logic in frame state machine 110 continually checks for the frame synchronization pattern 470 on each clock cycle that occurs within the search window. If the frame synchronization pattern 470 is matched, logic resets the frame interval bit counter and frame interval clock counter 130.

In general, the wireless receiver 10 uses its incoming-data clock 30 to establish a search window to continually search and validate synchronization. In an exemplary case, when the frame synchronizer 100 is synchronized to the frame synchronization pattern 470, the search window opens K bits before the N-bit-wide frame synchronization pattern 470 is expected to arrive and the search window closes K bits after the complete N-bit-wide frame synchronization pattern 470 has been received. The value of K is function of transmitter/receiver oscillators in parts per million (PPM).

If a valid synchronization is not detected using the incoming-data clock 30 from the wireless receiver 10, it is assumed that the wireless signal suffered error and data is written to the buffer 120 and tagged with a loss-of-sync status flag. The logic then increases the search window of N+(2×K) bits (or more than N+(2×K) bits) on each successive missed frame synchronization pattern until valid synchronization is re-established. The amount of increase in the search window is related to possible divergence of the transmitter oscillator and the receiver oscillator in PPM. When valid synchronization is re-established, the search window is reset to the original search window.

The input data frame 20 is received at the frame synchronizer 100 (an ASIC or an FGPA). The received payload 95 from the input data frame 20 is written to the buffer 120 over a serial data network. The output of the data in the buffer 120 is sent to the processor 50 (or another buffer external to the wireless receiver 10) and the frame state machine 110 delays the output of the synchronization real time interrupt 22 by that finite time. Once the data has all been sent to the processor 50, a synchronization real time interrupt (sync RTI) signal 22 is sent to the processor 50 to indicate to the processor 50 that the data sent from the buffer 120 can be processed.

In one implementation of this embodiment, the input data frames 20 is a sensor data frame 20 having a fixed-length bit sequence containing formatted sensor data and related information. The details about an exemplary embodiment for processing a data stream of sensor data frame 20 are now provided. A sensor data frame bit count is the number of bits in every sensor data frame 20.

The frame synchronization pattern 470 is the frame synchronization pattern represented by N number of bits. The frame sync bit count, which is the number of bits in the frame synchronization pattern 470, is also N bits. The frame interval time, which is the nominal interval between starts of transmissions of successive sensor data frames 20, is on the order of milliseconds, depending on the system channel error. The frame interval bit count is equal to the frame interval time times the bit rate. The frame interval clock count equals the receive side master clock rate times the frame interval time. It is assumed that the frequency of the transmit side transmitter clock 6 (in the wireless transmitter 5) and the frequency of bit sync clock 30 are close to exact, i.e., the same as their nominal values. The frame interval clock count is the number of cycles of the bit sync clock 30 (receive master clock 30) that occur during the frame interval time. The frame interval clock count is used to predict the arrival of the frame synchronization pattern 470. In one implementation of this embodiment, during the check mode 311, the frame synchronizer 100 uses the incoming-data clock 30 to count P bits (typically received on the order of milliseconds) and checks to see if all the expected frame synchronization patterns 470 were correctly received during that time frame. P is a positive integer.

Figure 4:
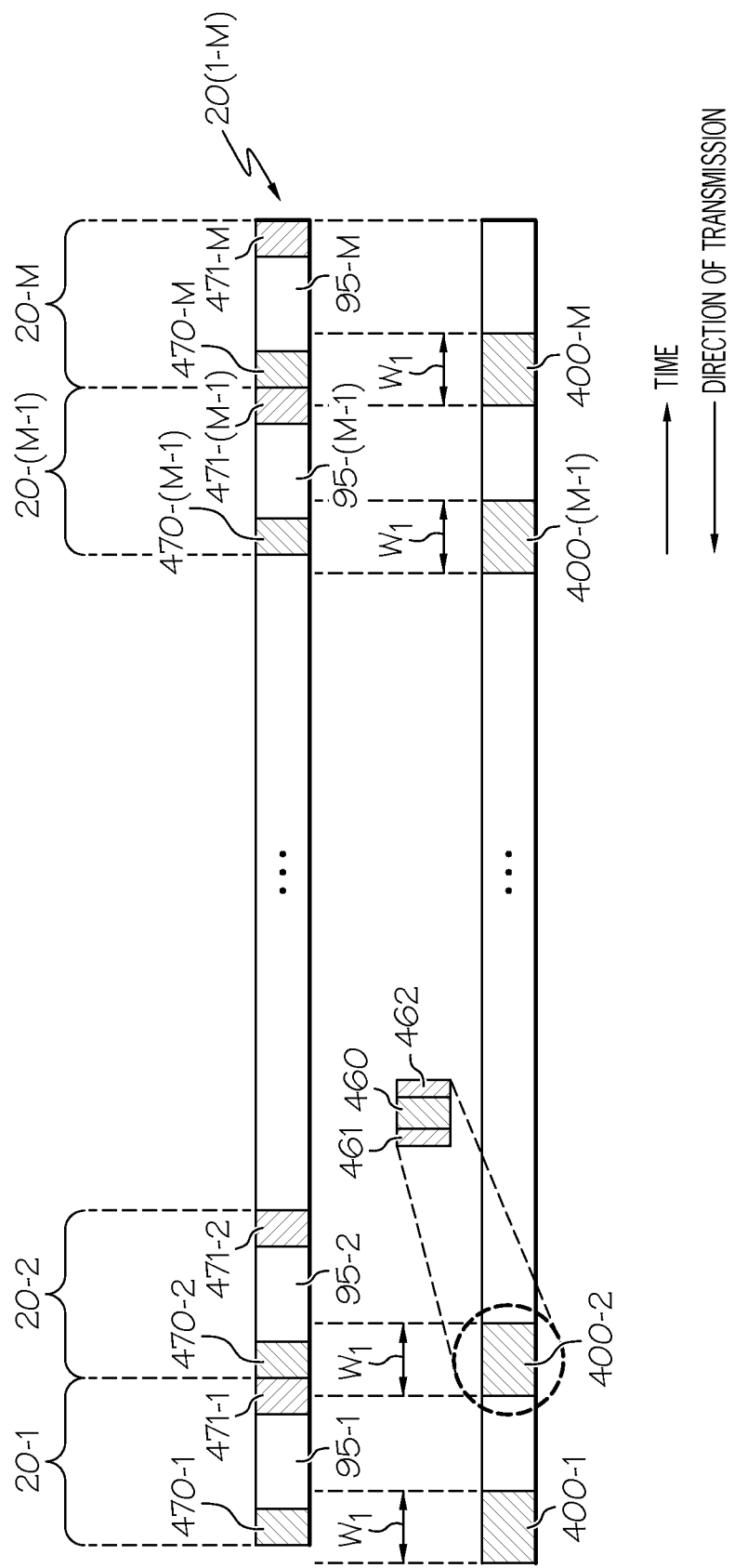
FIG. 4 is a block diagram showing data frames in a data stream in alignment to respective frame synchronization windows when synchronization is holding in accordance with the present invention.

FIG. 4 is a block diagram showing data frames 20-$i$ that form a data stream 20(1-M) in alignment to respective frame synchronization windows 400(1-M) when synchronization is holding in accordance with the present invention. The data stream 20(1-M) includes a plurality of input data frames 20-$i$, where i indicates the $i^{th}$ input data frame 20. Each input data frame 20-$i$ includes a frame synchronization pattern 470-$i$, where i indicates the $i^{th}$ frame synchronization pattern 470, and end of frame bits 471-$i$, where i indicates the $i^{th}$ end of frame bits 471. Each input data frame 20-$i$ also includes a data payload 95 and stuffed bits 91, which are represented generally as data 95-$i$, where i indicates the $i^{th}$ data payload 95 and stuffed bits 91. Each frame synchronization pattern 470-$i$ is the same known binary pattern as every other $j^{th}$ frame synchronization pattern 470-$j$.

The frame synchronization windows 400(1-M), shown in alignment to the data stream 20(1-M), are open for a duration longer than the duration required to receive the frame synchronization patterns 470(1-M). An exploded view of the exemplary frame synchronization window 400-2 is shown. Additional time, equivalent to the duration of additional bits represented generally at 461, is added to the time duration 460 of the frame synchronization pattern 470-$i$. This additional time 461 is referred to herein as pre-margin time 461. The additional time, equivalent to the duration of additional bits represented generally at 462, is added to the time duration 460 of the frame synchronization pattern 470-$i$. This additional time 462 is referred to herein as post-margin time 462. The synchronization is considered to be optimal when synchronization is holding and the number of pre-margin time 461 equals the number of post-margin time 461.

As described in more detail below, the frame synchronization windows 400(1-M) have a search-window width $W_1$ that is also referred to herein as the "initial width $W_1$" and the "initial search-window width $W_1$". The search-window width is that duration in time during which the search window is open, therefore the search-window width also referred to herein as "search-window duration" and the initial width $W_1$ is also referred to herein as "initial duration". The initial width $W_1$ of the frame synchronization windows 400(1-M) is extended when the frame synchronization pattern is lost. A frame synchronization window 400-$i$ is extended by adding time equivalent to the duration of at least one additional bit to the pre-margin time 461 and by adding time equivalent to the duration of at least one additional bit to the post-margin time 462. The duration in time of one additional bit is that time required for one bit to be received at the wireless receiver 10.

In one implementation of this embodiment, the duration of the pre-margin time 461 equals the duration of the post-margin time 462. In another implementation of this embodiment, time equivalent to the duration of one additional bit is added to the pre-margin time 461 and time equivalent to the duration of one additional bit is added to the post-margin time 462. In another implementation of this embodiment, time equivalent to the duration of five additional bits are added to the pre-margin time 461 and time equivalent to the duration of five additional bits are added to the post-margin time 461.

In one implementation of this embodiment, the duration of pre-margin time 461 and post margin time 462 is equal to the duration of 20 bits so the duration of the frame synchronization windows 400(1-M) is equal to the duration of 72 bits (assuming 32 bits for the frame synchronization pattern).

When synchronization is holding, the frame synchronization windows 400(1-M) (search windows 400(1-M)) correlated to the each of the input data frames 20(1-M) are in alignment to respective frame synchronization patterns 470(1-M) as shown in FIG. 4. The logic in frame state machine 110 checks for the frame synchronization pattern 470-$i$ on each clock cycle that occurs within the search window 400-$i$. When synchronization is holding, the search windows 400(1-M) have an initial search-window width $W_1$, which is greater than the width of the frame synchronization pattern 470-$i$.

Figure 5:
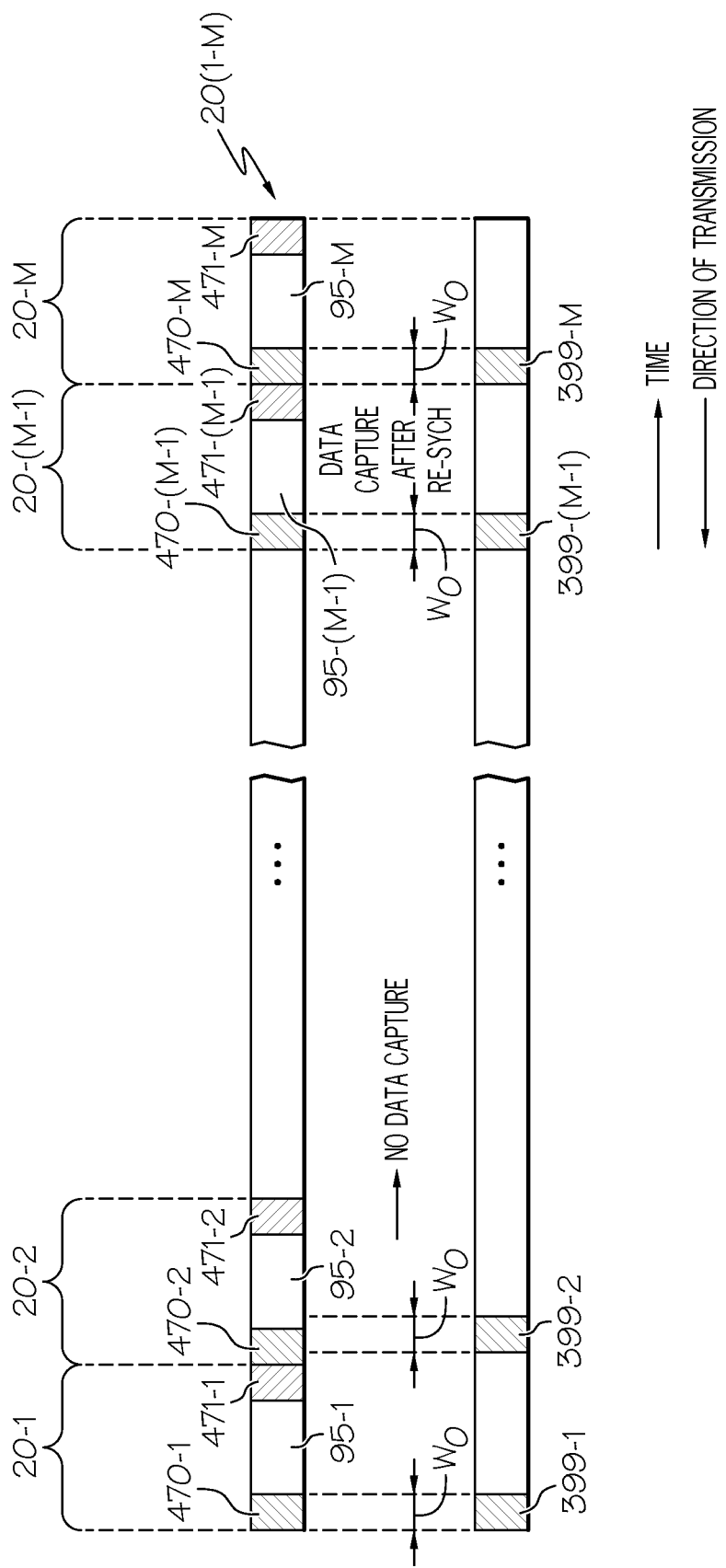
FIG. 5 is a block diagram showing data frames in a data stream in misalignment to respective frame synchronization windows in a prior art receiver when a frame synchronization pattern is received before expected.

FIG. 5 is a block diagram showing data frames 20-$i$ in a data stream 20(1-M) in misalignment to respective frame synchronization windows in a prior art receiver when a frame synchronization pattern is received before expected. The data stream 20(1-M) is the same structure as described above with reference to FIG. 4. The search window 399-$i$ in the prior art system only extends in time by a duration $W_0$ equal to the time required for the number of bits in the frame synchronization pattern 471-$i$ to be received. There are no pre-margin and post-margin time in the frame synchronization windows 399 (1-M). Thus, the initial search-window width $W_1$ of the frame synchronization windows 400(1-M) shown in FIG. 4 is greater than the width $W_0$ of frame synchronization windows 399(1-M) of the prior art system.

As shown in FIG. 5, the second frame synchronization pattern 470-2 is received before the second search window 400-2 opens for the logic in the prior art frame state machine to look for the second frame synchronization pattern 470-2. When the second search window 399-2 opens, the logic in prior art frame state machine reads the data in 95-2 which, typically, does not match the second frame synchronization pattern 470-2. When the logic in prior art frame state machine detects the mismatch, the prior art frame state machine is returned to search mode to search for the frame synchronization pattern. Once the prior art frame state machine finds the frame synchronization pattern, the prior art frame state machine cycles through the check/lock mode. This is a time consuming process during which data is lost.

Figure 6:
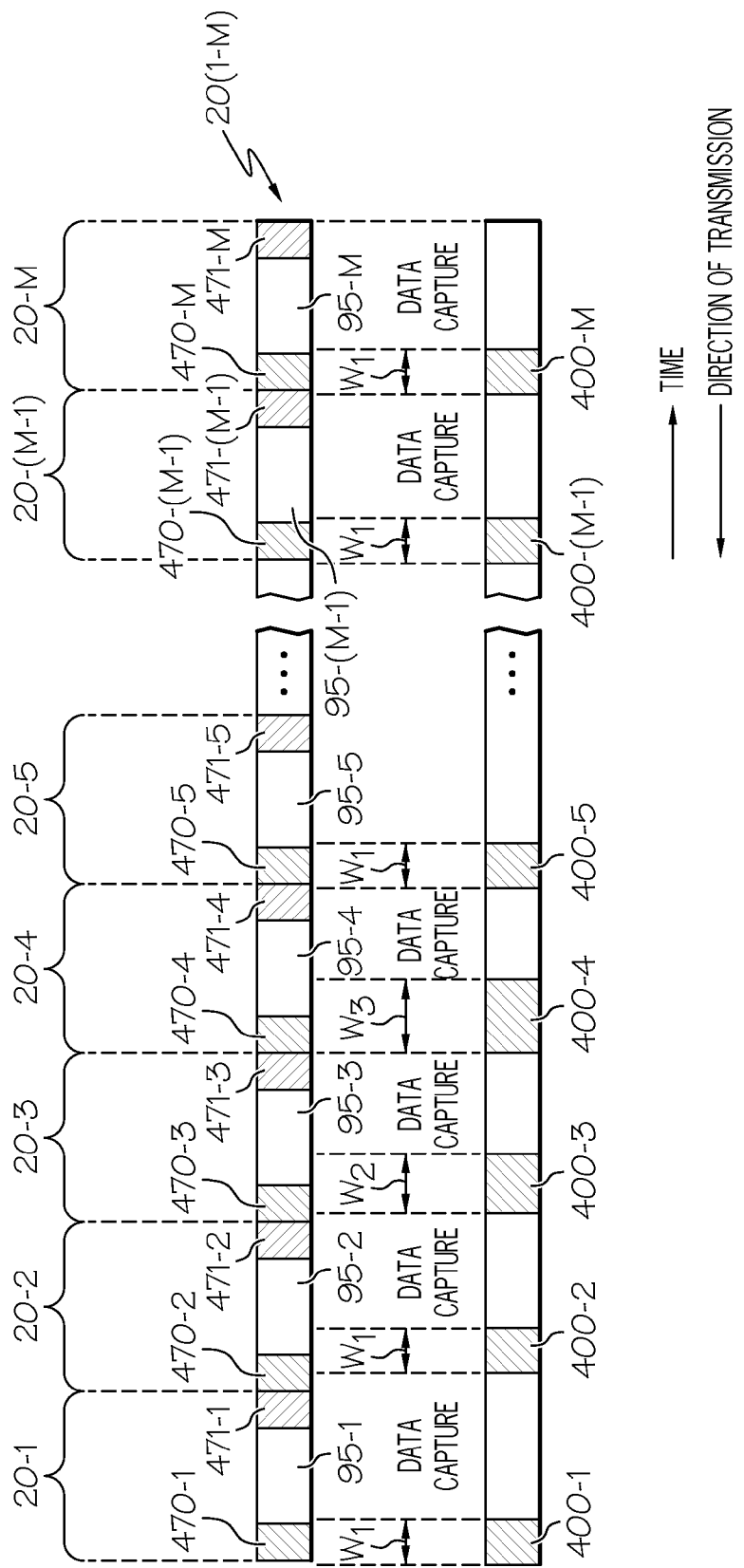
FIG. 6 is a block diagram showing data frames in a data stream in misalignment to respective frame synchronization windows when a frame synchronization pattern is received before expected in accordance with the present invention.

FIG. 6 is a block diagram showing data frames 20-$i$ in a data stream 20(1-M) in misalignment to respective frame synchronization windows when a frame synchronization pattern is received before expected in accordance with the present invention. The data stream 20(1-M) is the same structure as described above with reference to FIG. 4. As shown in FIG. 6, the second frame synchronization pattern 470-2 is received before the second search window 400-2 opens for the logic in the frame state machine 110 to look for the second frame synchronization pattern 470-2.

If the frame synchronization pattern arrives early (prior to the predicted time), the data 95-2 immediately following the frame synchronization pattern 470-2 is recorded in a buffer 120 (shown as data capture). Before the second search window 400-2 opens, the logic in frame state machine 110 receives a signal from the frame interval bit counter 130 that the frame synchronization pattern is predicted to arrive. The logic in frame state machine 110 receives this signal and, despite detecting the mismatch, the frame state machine 110 remains in operate mode 320 and sends data (with a loss-of-sync status flag) to be stored in the buffer 130 until the logic in frame state machine 110 detects a frame synchronization pattern 470-$i$.

When the logic in frame state machine 110 detects the mismatch, the frame synchronizer 100 also expands the search window 400 to form a wider search window 403-3. The search window 400-2 is expanded by adding time equivalent to the duration of at least one bit to the search window 400-2. In one implementation of this embodiment, time equivalent to the duration of one bit is added to the pre-margin time 461 of the search window 400-2 and time equivalent to the duration of one bit is added to the post-margin time 462 of the search window 400-2. In yet another implementation of this embodiment, time equivalent to the duration of five bits is added to the pre-margin time 461 of the search window 400-2 and time equivalent to the duration of five bits is added to the post-margin time 462 of the search window 400-2.

Thus, duration of the third search window 402-3 is extended in time. In one implementation of this embodiment, the third search window 402-3 extends over the time required to receive 52 bits and the frame synchronization pattern 470-$i$ is 32 bits. By increasing the time the search window is open, the frame synchronizer 100 is provided more of an opportunity to overlap with the frame synchronization pattern 470-$i$. In this manner, the frame synchronizer 100 is capturing data while remaining in operate mode and simultaneously expanding the search window in order to capture a frame synchronization pattern 470-$i$ in one of the following data frame 20-$i$. The time taken to find the frame synchronization pattern 470-$i$ in one of the following data frame 20-$i$ is less than the time required to return to search mode and check/lock mode as done by a prior art frame synchronizer and no data is lost while the frame synchronization pattern 470-$i$ in one of the following data frame 20-$i$ is being detected. Thus, the method of synchronization described herein prevents loss of data due to false lock or loss of synchronization by capturing the payload data as the frame state machine 110, while operating in the operate mode, re-establishes synchronization in a manner independent of the length of the data frame.

Figure 7:
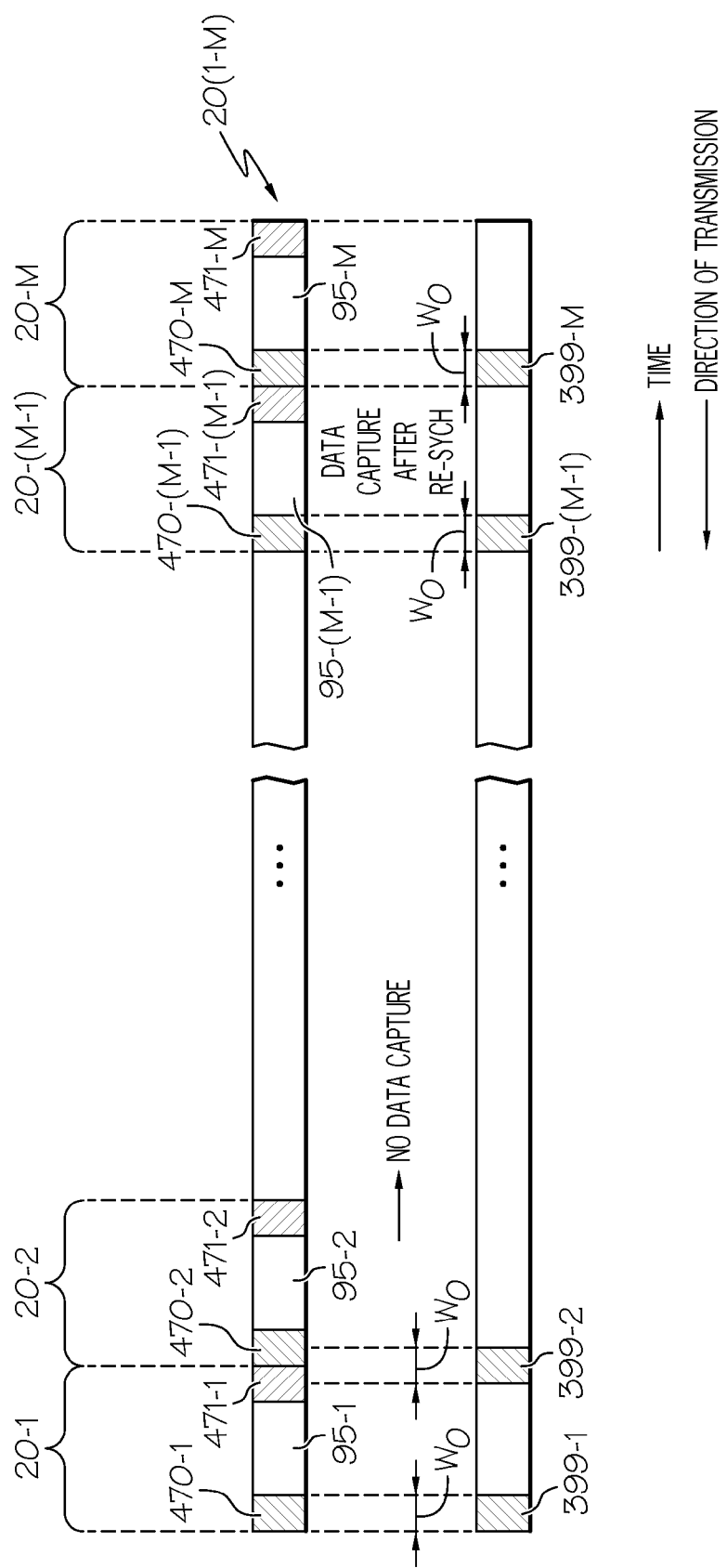
FIG. 7 is a block diagram showing data frames in a data stream in misalignment to respective frame synchronization windows in a prior art receiver when a frame synchronization pattern is received later than expected.

FIG. 7 is a block diagram showing data frames 20-$i$ in a data stream 20(1-M) in misalignment to respective frame synchronization windows 399(1-M) in a prior art receiver when a frame synchronization pattern 470-2 is received later than expected. The data stream 20(1-M) is the same structure as described above with reference to FIG. 4. As shown in FIG. 7, the second frame synchronization pattern 470-2 is received after the second search window 399-2 opens for the logic in the prior art frame state machine to look for the second frame synchronization pattern 470-2.

When the second search window 399-2 opens, the logic in prior art frame state machine reads the data in 95-1 (or data in the end-of-frame 471-1) which, typically, does not match the second frame synchronization pattern 470-2. When the logic in prior art frame state machine detects the mismatch, the prior art frame state machine is returned to search mode to search for the frame synchronization pattern. Once the prior art frame state machine finds the frame synchronization pattern, the prior art frame state machine cycles through the check/lock mode. This is a time consuming process during which data is lost.

Figure 8:
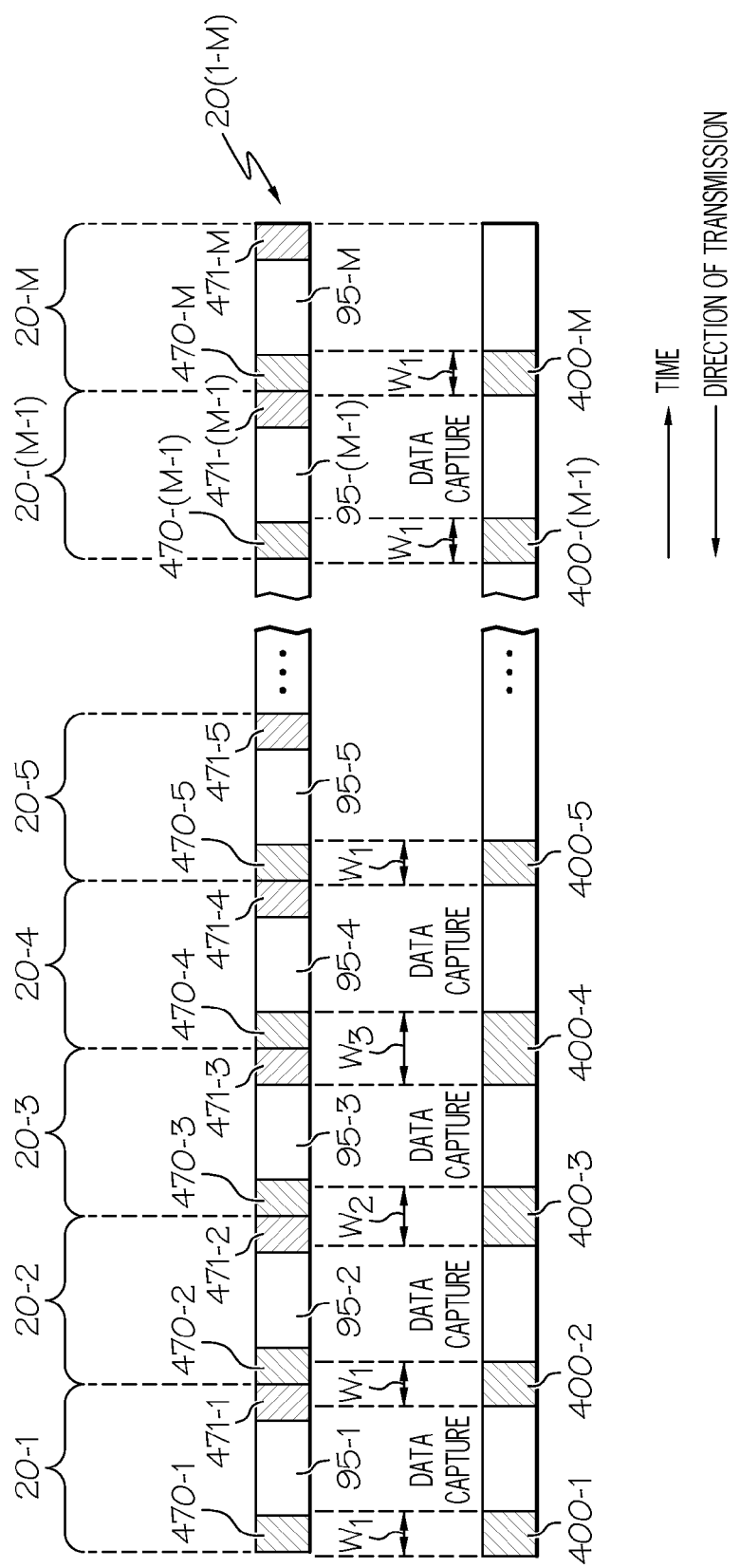
FIG. 8 is a block diagram showing data frames in a data stream in misalignment to respective frame synchronization windows when a frame synchronization pattern is received later than expected in accordance with the present invention.

FIG. 8 is a block diagram showing data frames 20-$i$ in a data stream 20(1-M) in alignment to respective frame synchronization windows 400(1-M) when a frame synchronization pattern 470-$i$ is received later than expected in accordance with the present invention. The data stream 20(1-M) is the same structure as described above with reference to FIG. 4. As shown in FIG. 8, the second frame synchronization pattern 470-2 is received after the second search window 400-2 opens for the logic in the frame state machine 110 to look for the second frame synchronization pattern 470-2. The logic in frame state machine 110 determines if a receipt time of the bit received when the bit clock rising edge was detected is coincident with an expected start time of the frame synchronization pattern When second search window 400-2 opens and the logic in the frame state machine 110 does not detect the frame synchronization pattern 470-2 (i.e., the frame state machine 110 detects a mismatch), the frame state machine 110 remains in operate mode 320. When the frame state machine 110 detects a mismatch, the logic in frame state machine 110 sends the data following the predicted time for the arrival of the frame synchronization pattern 470-2 to a buffer 120, which records the data (shown as data capture). The data is stored until the logic in frame state machine 110 detects a frame synchronization pattern 470-$i$. If the frame synchronization pattern 470-2 is detected later on in the data frame 20-2, the data that was recorded starting at the predicted time (i.e., when the second search window 400-2 opened) is overwritten by the data 95-2 following the frame synchronization pattern 470-2, since the data following the frame synchronization pattern 470-2 is correct data. Thus, the method of synchronization described herein prevents loss of data due to false lock or loss of synchronization by capturing the payload data as the frame state machine 110, while operating in the operate mode, re-establishes synchronization.

When the logic in frame state machine 110 detects the mismatch, the frame synchronizer 100 also expands the search window 400 to form a wider search window 400-3. The search window 400-2 is expanded by adding at least one bit to the search window 400-2. Thus, the duration of the third search window 400-3 is extended in time. By increasing the time the search window is open, the frame synchronizer 100 is provided more of an opportunity to overlap with the frame synchronization pattern 470-i. In this manner, the frame synchronizer 100 is capturing data while remaining in operate mode and simultaneously expanding the search window in order to capture a frame synchronization pattern 470-i in one of the following data frame 20-i. The time taken to find the frame synchronization pattern 470-i in one of the following data frame 20-i is less than the time required to return to search mode and check/lock mode as done by a prior art frame synchronizer and no data is lost while the frame synchronization pattern 470-i in one of the following data frame 20-i is being detected.

Figure 9:
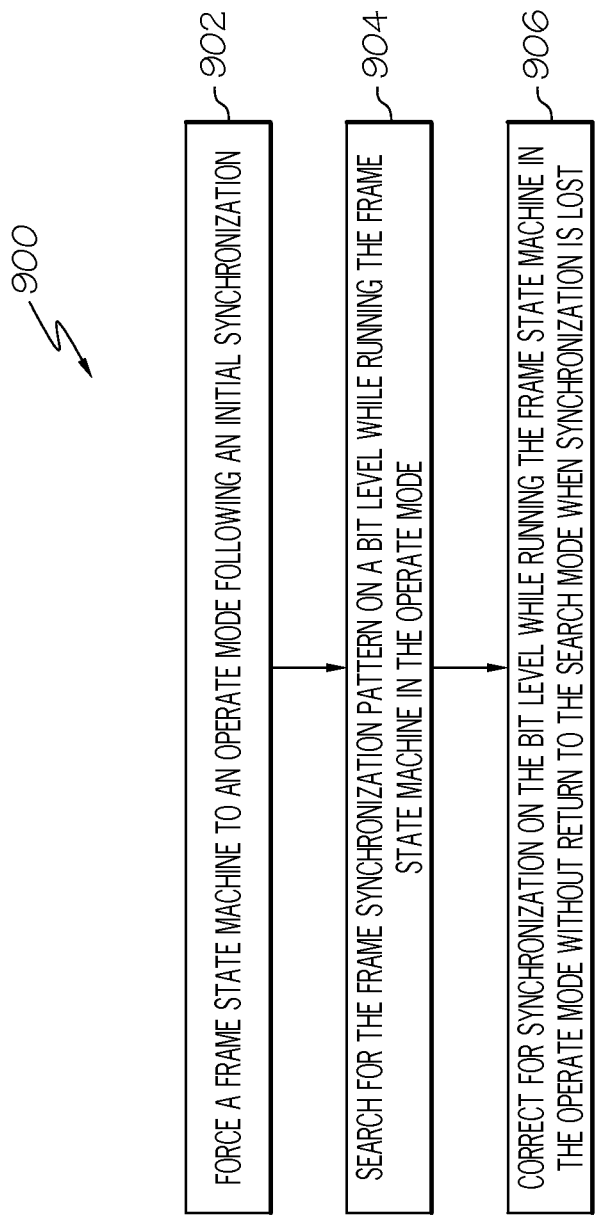
FIG. 9 is a flow diagram of one embodiment of a method to synchronize data frames in accordance with the present invention.

FIG. 9 is a flow diagram of one embodiment of a method 900 to synchronize data frames 20 when a frame synchronization pattern is lost in accordance with the present invention. The method 900 is described with reference to FIGS. 1 and 2 and uses a low latency, self adjusting frame synchronization algorithm (stored in software 85) for data streaming applications.

At block 902, a frame state machine 110 is forced to an operate mode 320 following an initial synchronization 315. The initial synchronization 315 includes a search mode 310 and a check/lock mode 311. A search window 400 is provided that is open for a duration longer than the duration required to receive the frame synchronization pattern 470 (see FIG. 4). The frame interval bit counter 130 is used to predict a search window when the frame synchronization pattern 470 is detectable.

At block 904, the frame synchronizer 100 searches for the frame synchronization pattern 470 (FIGS. 4, 6 and 8) on a bit level while running the Frame State machine 110 in the operate mode 320. The register 135 holds a number of bits equal to the number of bits in the frame synchronization pattern 470. The frame synchronizer 100 compares the bits in the register 135 with the known binary pattern in the frame synchronization pattern 470.

At block 906, the frame synchronizer 100 corrects for synchronization on the bit level while running the frame state machine 110 in the operate mode 320 when synchronization is lost.

The frame synchronizer 100 determines the frame synchronization pattern is lost if the frame synchronization pattern is not detected while the search window 400 is open. Even though the frame synchronizer 100 has not detected the frame synchronization pattern 470, the input data frame 20 (including the data 95) in the data stream 20(1-M) is captured based on the expected arrival time of the frame synchronization pattern 470. Thus, data 95 is not lost even when the frame synchronization pattern 470 is lost or corrupted. The method in which this is done is described in detail below with reference to FIG. 10.

Figure 10:
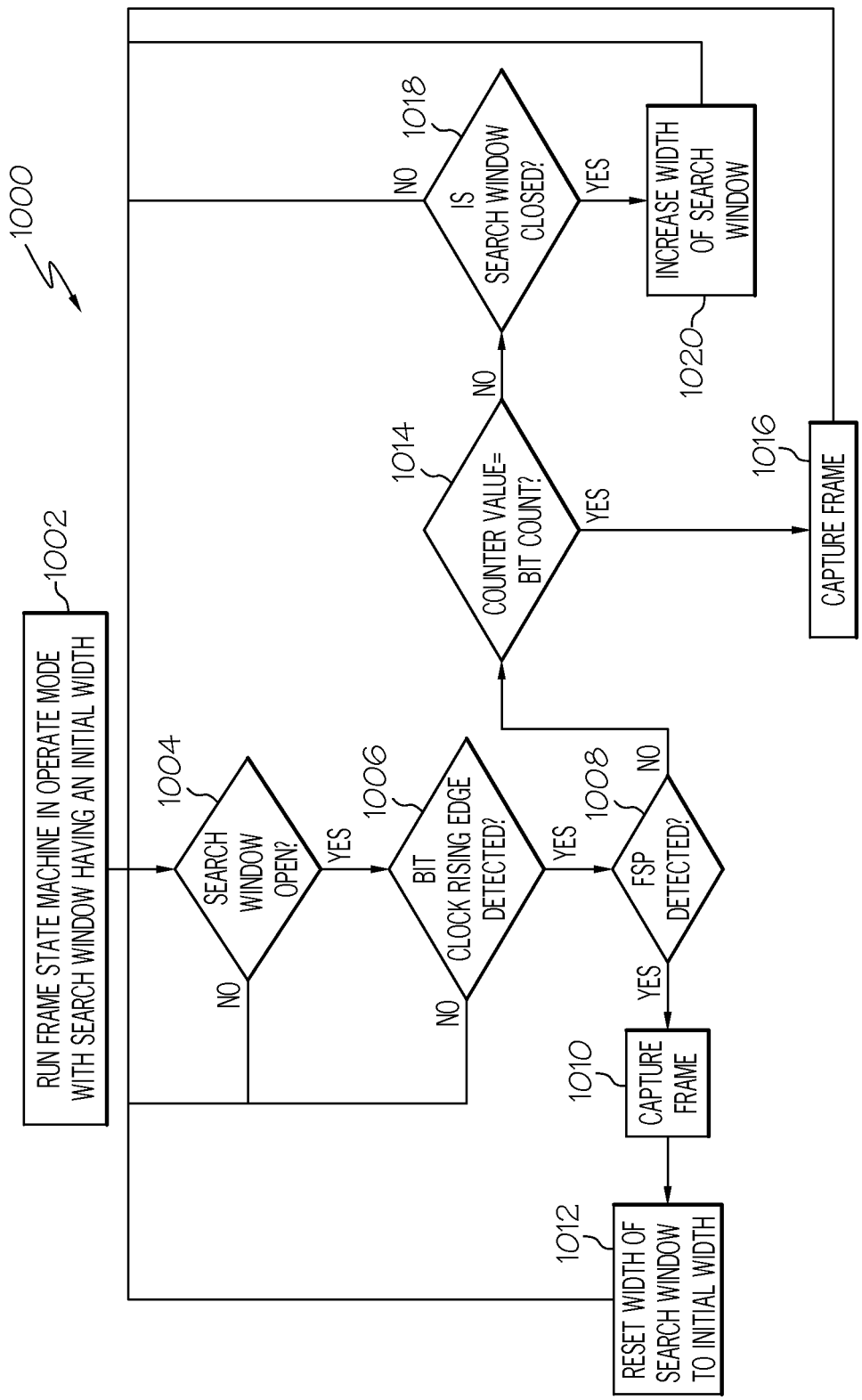
FIG. 10 is a flow diagram of one embodiment of a method to synchronize data frames when a frame synchronization pattern is lost in accordance with the present invention.

FIG. 10 is a flow diagram of one embodiment of a method 1000 to synchronize data frames 20 when a frame synchronization pattern is lost in accordance with the present invention. The flow diagram illustrates how a nominal decoder time phase alignment is maintained through a data drop-out period. The method 1000 is described with reference to the wireless receiver 10 of FIG. 1 and the data stream 20(1-M) in misalignment with frame synchronization windows as shown in FIG. 6 although it is to be understood that method 1000 can be implemented using the data stream 20(1-M) in misalignment with frame synchronization windows as shown in FIG. 8 as is understandable by one skilled in the art who reads this document.

At block 1004, the wireless receiver 10 determines determined if a search window is open. The search-window width of the search window is an initial width $W_1$, which is larger than the width of the frame synchronization pattern 470. The frame interval bit counter 130 indicates to the frame state machine 110 when the window is open. The frame interval bit counter 130 counts the received bits and when the number of bits in the frame minus the equivalent number of bits that are in the pre-margin time 461 is the number of bits counted, the window is opened. Thus, the window is opened prior to the expected arrival time of the frame synchronization pattern.

At block 1006, the wireless receiver 10 determines if a bit clock rising edge is detected. Based on a positive determination that the search window is open and based on a positive determination that the bit clock rising edge is detected, the searching for the frame synchronization pattern on the bit level commences.

At block 1008, the wireless receiver 10 determines if a frame synchronization pattern detected. When the N synchronization bits being stored in the register 135 all match the frame synchronization pattern the register sends a signal to the frame state machine 110 to indicate the frame synchronization pattern has been detected. The state machine is then set to indicate Sync_detect=1.

If frame synchronization pattern is detected, the count in the frame interval bit counter 130 is reset to 1 and sync.RTI in the RTI generator 140 is set to 1 to maintain synchronization of the RTI generator 140 with the frame synchronization pattern.

The flow proceeds to block 1010. At block 1010, the frame is captured in the buffer 120. The Start Frame Capture is set to 1 when the value in the frame interval bit counter 130 equals the Frame Sync End Count (i.e., when the complete frame synchronization pattern has been received and the next bit will be a payload bit) and the data is sent to the buffer 120. The data 95-i is sent to the buffer 120 for the duration of the time the payload data 95-i is being received. The frame state machine 110 knows how long it takes for the data 95-i between the end of the frame synchronization pattern 470-i and the beginning of the end-of-frame 471-i to be received and sends the data 95-i to the buffer 120 during that time.

At block 1012, the wireless receiver 10 resets the search-window width to the initial search-window width $W_1$ based on the capturing of the frame in the buffer 120. This process occurs even if the search-window width was not extended. Once the width of the search window is set to the initial search-window width $W_1$, the flow returns to block 1004.

If the frame synchronization pattern is not detected at block 1008, the flow proceeds to block 1014. In one implementation of this embodiment, the frame synchronization pattern is not detected because a glitch that drops one or more bits in the frame synchronization pattern. This is a corrupted frame synchronization pattern. In another implementation of this embodiment, one or more bits in the data 95-i are dropped or one or more bits in the end of frame (EOF) bits 471 are dropped. In this latter case, the frame synchronization pattern arrive time will be shifted by the number of dropped bits.

At block 1014, the wireless receiver 10 determines if a receipt time of the bit received when the bit clock rising edge was detected is coincident with an expected start time of the frame synchronization pattern 470-i. The receipt time of the bit received when the bit clock rising edge was detected is coincident with an expected start time of the frame synchronization pattern 470-i the value in the frame interval bit counter 130 equals a frame interval bit count. The frame interval bit count is the frame interval time times the bit rate. If the value of frame interval bit counter 130 equals the Frame Interval Bit Count, the data 95-i is expected to be received and the flow proceeds to block 1016. At block 1016, the frame is captured as described above with reference to block 1010 and the flow proceeds to block 1004.

If at block 1014, it is determined that the value of frame interval bit counter 130 does not equal the Frame Interval Bit Count, the flow proceed to block 1018. At block 1018, it is determined if the search window is closed. The search window is closed when the value in the frame interval bit counter 130 equals the frame sync end count.

If it is determined at block 1018 that the search window 400 is closed, the flow proceeds to block 1020. At block 1020, the width of the search window 400 is increased from a current search-window width responsive to a positive determination that the search window is closed. Time equivalent to the duration of at least one bit is added to the pre-margin time 461 of the search window 400-2 and time equivalent to the duration of at least one bit is added to the post-margin time 462 of the search window 400-2. In one implementation of this embodiment, time equivalent to the duration of at least one bit is added to one of the post-margin time 462 or the pre-margin time 461.

As shown in FIG. 6, when the search window 400-2 does not detect the frame synchronization pattern 470-2, the search window 400-2 is extended in duration from the current search-window width $W_1$ so the next search window 400-3 has an extended width $W_2$. The next search window 400-3 is opened in the approximate time frame of the next frame synchronization pattern. When the search window 400-3 does not detect the frame synchronization pattern 470-3, the search window 400-3 is extended in duration from the current search-window width $W_2$ so the next search window 400-4 has an extended width $W_3$. The search window 400-4 is wide enough to detect the frame synchronization pattern 470-4 so the search window 400-4 is reduced (according to block 1012 as described above) and the search window 400-5 is aligned to overlap the frame synchronization pattern 470-5. In this manner, a nominal decoder time phase alignment is maintained through the data drop-out period. The data drop-out period in this exemplary case extends from receipt of the frame synchronization pattern 470-2 to the receipt of the frame synchronization pattern 470-5.

The flow proceeds from block 1020 to block 1004. If there is a data drop-out period (i.e., when one or more bits are dropped from the input data frame 20-i), data is buffered (captured) while the frame synchronizer 100 searches for a frame synchronization pattern. The buffered data is sent from the buffer 120 to the processor 50, when the frame synchronizer 100 has resynchronized and the sync RTI signal 22 is sent to the processor from the frame state machine 110. In this manner, data (other than the originally dropped bit or bits) is not lost because of a data drop-out while the synchronization is being corrected. If a bit in the frame synchronization pattern was erroneous (a positive bit in place of a negative bit or vice versa) then data is not lost because of the erroneous bit while the synchronization is being corrected.

The embodiments described herein include wireless receivers and transmitters; however the same technique can be applied to receivers and transmitters that are communicatively coupled via wired connections.

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

What is claimed is:

1. A method for maintaining a nominal decoder time phase alignment through a data drop-out period, the method comprising:
   receiving a data frame comprising a number of bits;
   determining if a search window is open, wherein a search-window width of the search window is an initial search-window width, wherein the initial search-window width is larger than the width of a frame synchronization pattern;
   determining if a bit clock rising edge is detected;
   searching for the frame synchronization pattern on a bit level when the search window is open and the bit clock rising edge is detected; and
   if the frame synchronization pattern is not found responsive to the searching, determining if a receipt time of the bit received when the bit clock rising edge was detected is coincident with an expected start time of the frame synchronization pattern.

2. The method of claim 1, further comprising:
   capturing at least one frame in a buffer responsive to a positive determination that the bit receipt time is coincident with the expected start time of the frame synchronization pattern.

3. The method of claim 2, further comprising:
   determining if the search window is closed responsive to a negative determination that the bit receipt time is coincident with the expected start time of the frame synchronization pattern.

4. The method of claim 3, further comprising:
   increasing a search-window width from a current search-window width responsive to a positive determination that the search window is closed; and
   searching for a next frame synchronization pattern on the bit level while running the frame state machine in an operate mode.

5. The method of claim 4, further comprising:
   using a frame interval bit counter to predict when the frame synchronization pattern is detectable.

6. The method of claim 5, further comprising:
   determining the synchronization is lost if the frame synchronization pattern is not detected while the search window is open; and
   capturing data frames in the buffer during the data drop-out period based on a determination that the synchronization is lost, wherein data is not lost while the synchronization is being corrected.

7. The method of claim 1, further comprising:
   determining if the search window is closed responsive to a negative determination that the bit receipt time is coincident with the expected start time of the frame synchronization pattern.

8. The method of claim 7, further comprising:
   increasing a search-window width from a current search-window width responsive to a positive determination that the search window is closed; and searching for a next frame synchronization pattern on the bit level while running the frame state machine in an operate mode.

9. The method of claim 1, further comprising:

using a frame interval bit counter to predict when the frame synchronization pattern is detectable.

10. The method of claim 1, further comprising:

determining the synchronization is lost if the frame synchronization pattern is not detected while the search window is open; and capturing data frames in a buffer during the data drop-out period based on a determination that the synchronization is lost, wherein data is not lost while the synchronization is being corrected.

* * * * *